United States Patent
Potty et al.

(10) Patent No.: US 11,319,790 B2
(45) Date of Patent: May 3, 2022

(54) PROPPANT RAMP UP DECISION MAKING

(71) Applicant: Halliburton Energy Services, Inc., Houston, TX (US)

(72) Inventors: Ajish Potty, Missouri City, TX (US); Chaitanya Karale, Houston, TX (US); Ubong Inyang, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 12 days.

(21) Appl. No.: 16/668,791

(22) Filed: Oct. 30, 2019

(65) Prior Publication Data

US 2021/0131254 A1 May 6, 2021

(51) Int. Cl.
| | |
|---|---|
| *E21B 43/267* | (2006.01) |
| *C09K 8/62* | (2006.01) |
| *E21B 47/00* | (2012.01) |
| *E21B 49/00* | (2006.01) |
| *C09K 8/80* | (2006.01) |
| *E21B 43/26* | (2006.01) |
| *E21B 41/00* | (2006.01) |

(52) U.S. Cl.
CPC .............. *E21B 43/267* (2013.01); *C09K 8/62* (2013.01); *C09K 8/80* (2013.01); *E21B 41/0092* (2013.01); *E21B 47/00* (2013.01); *E21B 49/00* (2013.01)

(58) Field of Classification Search
CPC .. E21B 43/26; E21B 43/2605; E21B 43/2607; E21B 43/27; E21B 49/00; E21B 43/267; E21B 47/00; E21B 47/006; C09K 8/80; C09K 8/62

See application file for complete search history.

(56) References Cited

U.S. PATENT DOCUMENTS

| | | | |
|---|---|---|---|
| 4,993,491 | A | 2/1991 | Palmer et al. |
| 5,441,340 | A | 8/1995 | Cedillo et al. |
| 6,439,310 | B1 | 8/2002 | Scott, III et al. |
| 6,795,773 | B2 | 9/2004 | Soliman et al. |
| 6,935,424 | B2 | 8/2005 | Lehman et al. |
| 7,210,528 | B1 | 5/2007 | Brannon et al. |
| 7,451,812 | B2 | 11/2008 | Cooper et al. |
| 7,451,820 | B2 | 11/2008 | Albers et al. |

(Continued)

*Primary Examiner* — Catherine Loikith
(74) *Attorney, Agent, or Firm* — John Wustenberg; Baker Botts L.L.P.

(57) ABSTRACT

Methods and systems for monitoring and controlling a hydraulic fracturing operation to generate a real-time treatment plan are provided. The methods of the present disclosure include providing a treatment fluid; introducing the treatment fluid into a wellbore penetrating at least a first portion of a subterranean formation at or above a pressure sufficient to create or enhance one or more formation entry points in the subterranean formation; measuring one or more properties of the treatment fluid or downhole conditions within the subterranean formation; creating a treatment plan substantially in real-time including one or more plans selected from the group consisting of: a proppant placement plan, a fluid placement plan, a completion plan, and any combination thereof, wherein the treatment plan is based at least partially on the one or more properties of the treatment fluid or downhole conditions; and treating at least the first portion of the subterranean formation in accordance with the treatment plan.

18 Claims, 5 Drawing Sheets

(56) References Cited

U.S. PATENT DOCUMENTS

| | | |
|---|---|---|
| 7,516,793 B2 | 4/2009 | Dykstra |
| 7,673,507 B2 | 3/2010 | Walters et al. |
| 7,938,181 B2 | 5/2011 | Dusterhoft et al. |
| 9,135,475 B2 * | 9/2015 | Lecerf ............... E21B 43/26 |
| 9,909,404 B2 * | 3/2018 | Hwang ............ E21B 43/267 |

* cited by examiner

PROPPANT RAMP UP DECISION MAKING

BACKGROUND

The present disclosure relates to methods and systems for treating subterranean formations. More particularly, the present disclosure relates to methods and systems for monitoring and controlling a hydraulic fracturing operation to generate a real-time treatment plan.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

An example of a subterranean treatment that may use an aqueous treatment fluid is hydraulic fracturing. In an example hydraulic fracturing treatment, a fracturing fluid may be introduced into the formation at a high enough rate to exert sufficient pressure on the formation to create and/or extend fractures therein. The fracturing fluid may suspend proppant particles that are to be placed in the fractures to prevent the fractures from fully closing when hydraulic pressure is released, thereby forming conductive channels within the formation through which hydrocarbons can flow toward the wellbore for production. Before beginning a hydraulic fracturing operation, a determination of whether to use a "Step" proppant procedure or "Ramp" proppant procedure may be made. For example, after monitoring and analyzing a subterranean formation, a decision to deliver the proppant to the wellhead using a "Step" procedure, where a measured amount or concentration of proppant may be introduced into the formation, followed by an increased amount, followed by a further increased amount, and so on until the maximum proper proppant concentration is attained or the total desired mass of proppant is placed into the formation. Similarly, after monitoring and analyzing a subterranean formation, a decision to deliver the proppant to the wellhead using a "Ramp" procedure, where an initially amount of proppant may be introduced into the formation followed by a steadily and constantly increasing amount of proppant that may be introduced into the formation until the maximum proper concentration is attained.

BRIEF DESCRIPTION OF THE DRAWINGS

These drawings illustrate certain aspects of some of the embodiments of the present disclosure, and should not be used to limit or define the claims.

Figure 1:
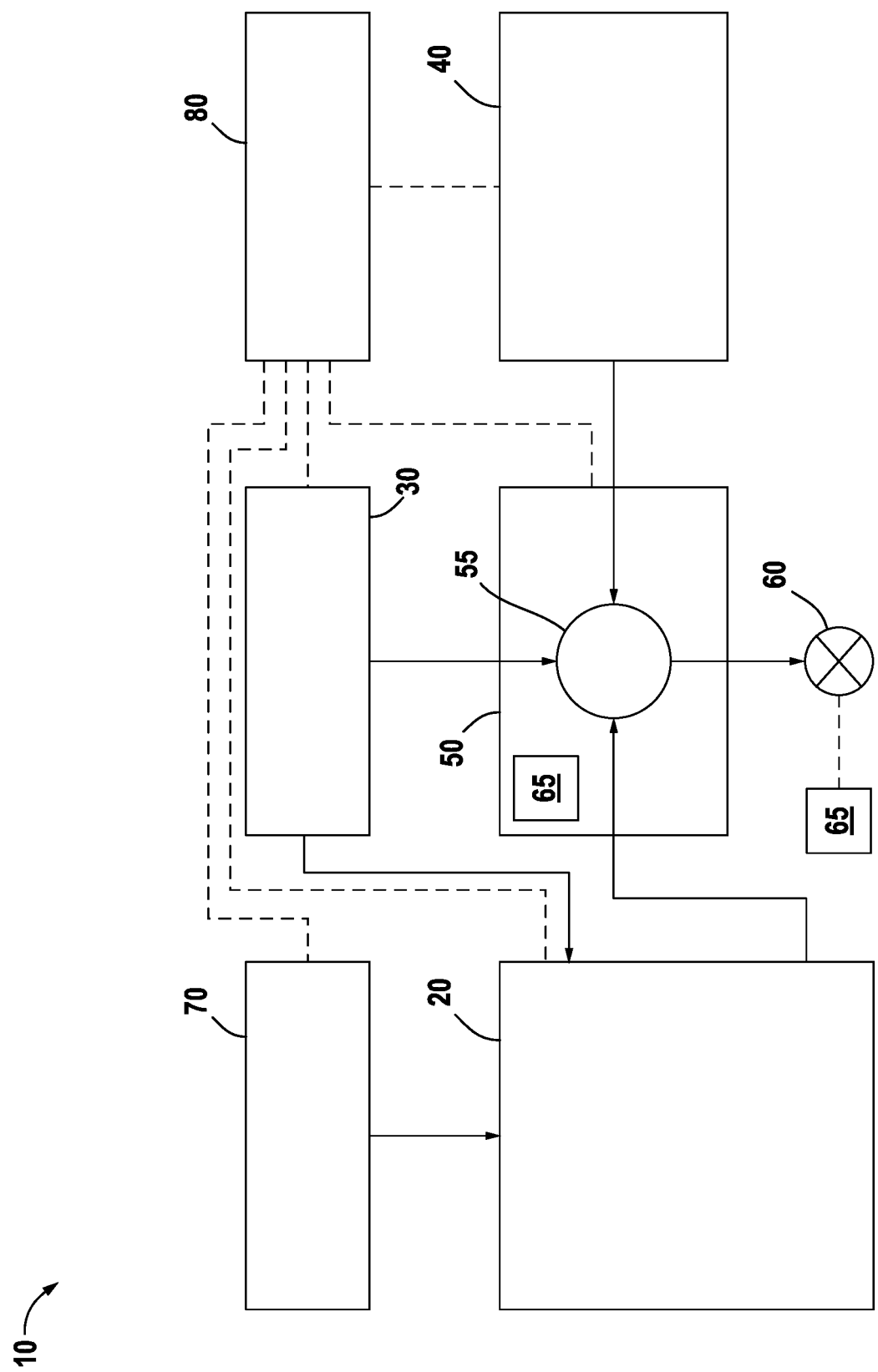
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to methods and systems for treating subterranean formations. More particularly, the present disclosure relates to methods and systems for monitoring and controlling a hydraulic fracturing operation to generate a real-time treatment plan.

The present disclosure provides methods and systems that include providing a treatment fluid; introducing the treatment fluid into a wellbore penetrating at least a first portion of a subterranean formation at or above a pressure sufficient to create or enhance one or more formation entry points in the subterranean formation; measuring one or more properties of the treatment fluid or downhole conditions within the subterranean formation; creating a treatment plan substantially in real-time including one or more plans selected from the group consisting of: a proppant placement plan, a fluid placement plan, a completion plan, and any combination thereof, wherein the treatment plan is based at least partially on the one or more properties of the treatment fluid or downhole conditions; and treating at least the first portion of the subterranean formation in accordance with the treatment plan.

Among the many potential advantages to the methods and systems of the present disclosure, only some of which are alluded to herein, the methods and systems of the present disclosure may provide a proppant placement plan that improves proppant placement efficiency within a fracturing zone. For example, the methods and systems of the present disclosure may be used to form a proppant placement plan during a hydraulic fracturing operation. In some embodiments, the methods and systems of the present disclosure include making a determination of whether to use a "Step" proppant procedure or a "Ramp" proppant procedure after the pad stage of the hydraulic fracturing operation. Fracture simulators may be used to make a similar determination before the hydraulic fracturing operation begins, but fracture simulators tend to assume that all clusters treat similarly. However, data from fiber optics (distributed acoustic sensing (DAS), distributed temperature sensing (DTS)) and microseismic sensors demonstrate that many fracturing operations may result in unequal fluid and proppant distribution into the formation entry points. Further, fluid flow into formation entry points may start evenly during the pad stage but may become progressively uneven as the proppant stage is pumped. This unevenness in slurry distribution may lead to under-stimulation of the clusters, inefficient use of fracturing material and fracturing pump horsepower, and sometimes well bashing. Therefore, the methods and systems of the present disclosure may advantageously determine a proppant placement plan that takes advantage of measured flow distribution or resistance information when the proppant stage begins.

As used herein, the term "flow resistance" refers to the additional pressure drop through the formation entry points. Flow resistance may be determined based on a count of open perforation relative to a total count of perforations or the relative flow area of the entry points available to flow. The count or number of open perforations may be estimated based on the friction pressure drop while pumping or during a step-down test.

Hydraulic fracturing is a stimulation treatment that may be used to enhance production of fluids from subterranean formations. Hydraulic fracturing may be employed to stimulate wells which produce from low permeability formations. In such wells, recovery efficiency may be limited by the flow mechanisms associated with a low permeability formation. A hydraulic fracturing operation may include different steps or stages. For example, a hydraulic fracturing operation may include a spearhead stage, a pad stage, a proppant stage, and a flush stage. During the spearhead stage, a treatment fluid may be introduced into the subterranean formation to clear debris that may be present in the wellbore. In some spearhead stages, the treatment fluid may be a mix of water with diluted acid. The spearhead stage may provide a clearer pathway for fluids used in subsequent fracturing stages to access the subterranean formation. During the pad stage, a treatment fluid may be introduced into the subterranean formation at or above a sufficient hydraulic pressure to create or enhance one or more pathways, or "fractures," in the subterranean formation. These fractures may increase the permeability and/or conductivity of that portion of the formation. During the proppant stage, a mixture of a treatment fluid with one or more proppants may be introduced into the subterranean formation. The proppant particulates may help prevent the fractures from fully closing upon the release of the hydraulic pressure, forming conductive channels through which fluids may flow to a well bore. During the flush stage, a volume of a treatment fluid (e.g., fresh water) may be pumped down the wellbore to remove any excess water or other treatment fluids that may be present in the wellbore. A person of skill in the art would understand that any particular hydraulic fracturing operation may include any combination of these, or other stages. Not all hydraulic fracturing operations may include all of the stages discussed above. Further, some hydraulic fracturing operations may include multiple instances of the same stage. For example, some hydraulic fracturing operations may include multiple pad stages and proppant stages carried out in alternating waves.

The methods and systems of the present disclosure may be used to efficiently place proppant in one or more formation entry points within a fracturing layer of a subterranean formation. As used herein, the terms "formation entry points" or "perforation clusters" designate a number of groups of perforations over the length of a perforated interval. There is a principal difference in how these terms are currently used in the industry and the way they are used in this disclosure. In some embodiments, each formation entry point may be spread out among multiple pay zones (layers) of a fracturing layer. For example, a subterranean formation may have three pay zones, each of which could have its own formation entry point. In other embodiments, the formation entry points may be located within a single pay zone.

As used herein, the term "fracturing layer" designates a layer, or layers, of rock that are intended to be fractured in a single fracturing treatment. A person of skill in the art would understand that a "fracturing layer" may include one or more than one of rock layers or strata as may be defined by differences in permeability, rock type, porosity, grain size, Young's modulus, fluid content, or any of many other parameters. In other words, a "fracturing layer" is the rock layer or layers in contact with all the perforations through which fluid is forced into the rock in a given treatment. The operator may choose to fracture, at one time, a "fracturing layer" that includes water zones and hydrocarbon zones, and/or high permeability and low permeability zones (or even impermeable zones such as shale zones) etc. Thus a "fracturing layer" may contain multiple regions that are conventionally called individual layers, strata, zones, streaks, pay zones, etc., and such terms are used in their conventional manner to describe parts of a fracturing layer. Typically, the fracturing layer contains a hydrocarbon reservoir, but the methods and systems of the present disclosure may also be used for fracturing water wells, storage wells, injection wells, etc. Note also that the present disclosure is described in terms of circular perforations (e.g., holes as created with shaped charges), normally having perforation tunnels. However, the methods and systems of the present disclosure may also be practiced with other types of "perforations," for example openings or slots cut into the tubing by jetting.

In certain embodiments, the methods and systems of the present disclosure may include generating a treatment plan in real-time or substantially in real-time, wherein the treatment plan includes one or more plans selected from the group consisting of a proppant placement plan, a fluid placement plan, a completion plan, and any combination thereof. As used herein, "real-time" refers to events that occur or are measured while a treatment operation is concurrently taking place. For example, a real-time calculation may be based at least in part on measurements or data taken during the concurrent treatment operation. Similarly, a substantially real-time calculation may be based at least in part on measurements or data taken during the concurrent treatment operation or may be based at least in part on measurements or data taken immediately before or after a treatment operation. In some embodiments, the treatment plan of the present disclosure may be based at least partially on the one or more properties of the treatment fluid or downhole conditions.

In some embodiments, the methods and systems of the present disclosure may use a treatment plan to adequately stimulate fracturing layers through one or more formation entry points with proppant. Without intending to be limited to any particular theory or mechanism, it is believed that the treatment plan may impact the efficiency of production of hydrocarbons from formation entry points. For example, a formation entry point that has been adequately stimulated with proppant may be more efficient at production of hydrocarbons than a formation entry point that has not been adequately stimulated with proppant. Thus, in certain embodiments, the methods and systems of the present disclosure may provide a treatment plan that maximizes proppant placement within one or more formation entry points. In some embodiments, the proppant placement plan may include a "Step" procedure, where a measured amount of proppant may be introduced into the formation, followed by an increased amount, followed by a further increased amount, and so on until the proper proppant concentration and or mass is attained. In some embodiments, the use of a "Step" proppant procedure may introduce a higher quantity of proppant into the subterranean formation in the later portions of the proppant stage or schedule. In one or more embodiments, the "Step" proppant procedure may have an initial proppant concentration in the treatment fluid in a range of from about 0.1 ppg to about 15 ppg. In certain embodiments, the "Step" proppant procedure may have a final proppant concentration in the treatment fluid in a range of from about 0.25 to about 8 ppg. In some embodiments, the "Step" proppant procedure may increase the proppant concentration in a range of from about 0.5 to about 3 ppg for each step of the proppant stage.

In other embodiments, the proppant placement plan may include a "Ramp" procedure, where an initially amount of proppant may be introduced into the formation followed by a steadily and constantly/gradually increasing amount of proppant that may be introduced into the formation until the maximum concentration is attained. In some embodiments, the use of a "Ramp" proppant procedure may introduce a higher quantity of proppant into the subterranean formation in the earlier portions of the proppant stage. In one or more embodiments, the "Ramp" proppant procedure may have an initial proppant concentration in the treatment fluid in a range of from about 0.1 ppg to about 15 ppg. In certain embodiments, the "Ramp" proppant procedure may have a final proppant concentration in the treatment fluid in a range of from about 0.25 to about 8 ppg. In one or more embodiments, the "Ramp" proppant procedure may include a time to maximum concentration. In some embodiments, the time to maximum concentration may be in a range of from about 10 seconds to about 12 hours. In other embodiments, the time to maximum concentration may be from about 30 seconds to about 6 hours. In still others, the time to maximum concentration may be from about 10 minutes to about 2 hours. In some embodiments, the "Ramp" proppant procedure may include a linear or substantially linear rate of proppant concentration increase. In other embodiments, the "Ramp" proppant procedure may include a variable rate of proppant concentration increase. For example, in one or more embodiments, the slope of a graph of the proppant concentration versus time may be a curved line, multiple curved lines, linear or near substantially linear line, horizontal line, vertical line, or any combination thereof. Other slopes are possible. In some embodiments, the rate of proppant concentration increase may be higher at the beginning of the proppant placement plan and decrease as the proppant placement plan reaches a target concentration. In other embodiments, the rate of proppant concentration may be lower at the beginning of the proppant placement plan and decrease as the proppant plan reaches a target concentration. In still other embodiments, the rate of proppant concentration may vary from higher to lower concentrations throughout the proppant placement plan.

In certain embodiments, the methods and systems of the present disclosure may make a determination of whether the proppant placement plan will use a "Step" proppant procedure or "Ramp" proppant procedure. In some embodiments, the determination may be made substantially in "real-time" during a hydraulic fracturing operation. For example, in certain embodiments, the determination of whether to use a "Step" proppant procedure or a "Ramp" proppant procedure may occur between the pad stage and the proppant stage. In other embodiments, the determination of whether to use a "Step" proppant procedure or a "Ramp" proppant procedure may change during the proppant stage. In other words, in one or more embodiments, the methods and systems of the present disclosure may initially determine that a "Step" proppant procedure is appropriate, but as the proppant stage proceeds, it may become clear that a "Ramp" proppant procedure is more appropriate. In some embodiments, the methods and systems of the present disclosure may be used in a single proppant stage. In other embodiments, the methods and systems of the present disclosure may be used in multiple proppant stages. In some embodiments, the proppant placement plan may be the same across all proppant stages. In other embodiments, the proppant placement plan may be different across different proppant stages.

In some embodiments, the treatment plan of the present disclosure may be based, at least in part, on the uniformity index of the formation entry points. The uniformity index may be a measure of formation entry point efficiency. The uniformity index may be defined by the following equation:

$$UI = 1 - \left(\frac{SD}{\text{Mean}}\right)$$

wherein SD is the standard deviation of a measurement of the slurry volume or proppant mass placed into each formation entry point and Mean is the average slurry volume or proppant mass placed into each formation entry point. The higher the uniformity index value, the more evenly distributed the flow of fluid into the formation entry points may be. Thus, in certain embodiments, the methods and systems of the present disclosure include a treatment plan that maximizes the amount of proppant placed in the subterranean formation while the uniformity index is high. In some embodiments, the uniformity index may be lower at the beginning of the proppant stage than it is expected to be at the end of the proppant stage. In those embodiments, the proppant placement plan may be selected to include a "Step" proppant procedure. In other embodiments, the uniformity index may be higher at the beginning of the proppant stage than it is expected to be at the end of the proppant stage. In those embodiments, the proppant placement plan may be selected to include a "Ramp" proppant procedure. In certain embodiments, the proppant placement plan may be based at least in part on a comparison of the measured uniformity index to a predetermined setpoint. In one or more embodiments, the predetermined setpoint value may be selected based on empirical data that suggests that a "Ramp" proppant procedure may be better above the predetermined setpoint and that a "Step" proppant may be better below the predetermined setpoint. In some embodiments, the measured uniformity index may be lower than the predetermined setpoint. In those embodiments, the proppant placement plan may be selected to include a "Step" proppant procedure. In other embodiments, the measured uniformity index may be higher than the predetermined setpoint. In those embodiments, the proppant placement plan may be selected to include a "Ramp" proppant procedure.

In some embodiments, the treatment plan may be based, at least in part, on a calibrated fracture model. In one or more embodiments, fracturing models, which may predict the propagation of fractures through a formation of given mechanical properties in relation to the pad volume, pumping rate, and rheologic properties of the fracturing fluid being used, may be employed to plan a fracturing fluid pumping process to create a targeted fracture. In some embodiments, a two-dimensional model such as the Khristianovic-Geertsma-de-Klerk model and the Perkins-Kern-Nordgren model may be used. In some embodiments, a fracture model for a hydraulic fracture in a wellbore can be updated and calibrated to create a calibrated fracture model. For example, in one or more embodiments, information about a microseismic event, fiber optics measurement (distributed acoustic sensing (DAS) and distributed temperature sensing (DTS), tilt meter event, logs, formation cuttings, diagnostic fracture injection test (DFIT) can be received from sensors that are monitoring or measuring a response or property from a subterranean formation. In some embodiments, the information can be received subsequent, during, or before a fracturing fluid is introduced into the formation. In certain embodiments, an observed geometry of a hydraulic fracture can be determined based on the information and a predicted geometry of the fracture can be determined based on properties of the fracking fluid and a fracture model. In other embodiments, the fracture model can be updated using the information where it is determined that an uncertainty value of the observed geometry does not exceed a pre-set maximum. In one or more embodiments, the uncertainty value can be based on the predicted geometry of the hydraulic fracture.

In some embodiments, the methods and systems of the present disclosure include one or more sensors to measure characteristics of the flow distribution or resistance within the subterranean formation. In some embodiments, the measurements obtained from these sensors may be used to calculate the uniformity index of the formation entry points. In one or more embodiments, the measurements obtained from these sensors may be taken during the pad stage of the hydraulic fracturing operation. In some embodiments, the measurements taken from these sensors may continue to be taken throughout the proppant stage of the hydraulic fracturing operation. In one or more embodiments, the measurements may be taken using a monitoring system that may include one or more sensors for collecting data relating to downhole operating conditions and formation characteristics along the wellbore. In some embodiments, the sensors may serve as real-time data sources for various types of downhole measurements and diagnostic information pertaining to each stage of the stimulation treatment. In some embodiments, temporary sensors may be used. In other embodiments, permanently installed sensors may be used. In still other embodiments, a combination of temporary and permanently installed sensors may be used.

In one or more embodiments, the sensors may include fiber optic cables cemented in place in the annular space between the casing and formation. In some embodiments, the fiber optic cables may be clamped to the outside of the casing during the deployment and protected by centralizers and cross coupling clamps. In certain embodiments, the types of permanent sensors may include surface and downhole pressure sensors, where the pressure sensors may be capable of collecting data at rates up to 2,000 Hz or even higher. In one or more embodiments, the fiber optic cables may house one or more optical fibers that may be single-mode fibers, multi-mode fibers, or a combination of single-mode and multi-mode optical fibers. In certain embodiments, the optical fibers may be connected to one or more fiber optic sensing systems. In some embodiments, the fiber optic sensing systems connected to the optical fibers may include Distributed Temperature Sensing (DTS) systems, Distributed Acoustic Sensing (DAS) Systems, Distributed Strain Sensing (DSS) Systems, quasi-distributed sensing systems where multiple single point sensors may be distributed along an optical fiber/cable, or single point sensing systems where the sensors may be located at the end of the cable.

In certain embodiments, the fiber optic sensing systems may operate using various sensing principles. In some embodiments, the sensing principles may include amplitude-based sensing systems such as, for example, DTS systems based on Raman scattering. In other embodiments, the sensing principles may include phase sensing based systems such as, for example, DAS systems based on interferometric sensing. In embodiments using DAS systems based on interferometric sensing, the interferometric sensing may use homodyne or heterodyne techniques where the system may sense phase or intensity changes due to constructive or destructive interference. In still other embodiments, the sensing principles may include strain sensing systems such as, for example, DSS using dynamic strain measurements based on interferometric sensors or static strain sensing measurements using Brillouin scattering, quasi-distributed sensors based on Bragg Gratings (FBGs) where a wavelength shift may be detected or multiple FBGs may be used to form Fabry-Perot type interferometric sensors for phase or intensity based sensing, or single point fiber optic sensors based on Fabry-Perot or FBG or intensity based sensors.

In certain embodiments, the sensors may include one or more pressure sensors. In one or more embodiments, the pressure sensors may be electrical sensors. In some embodiments where the pressure sensors are electrical sensors, the pressure sensors may be quarts type sensors. In other embodiments where the pressure sensors are electrical sensors, the pressure sensors may be strain gauge based sensors. In one or more embodiments, the pressure sensors may be optical sensors. In certain embodiments, the pressure sensors may be housed in dedicated gauge mandrels. In other embodiments, the pressure sensors may be attached outside the casing in various configurations for down-hole deployment or deployed conventionally at the surface well head or flow lines.

In certain embodiments, temperature measurements (from, e.g., a DTS system) may be used to determine locations for fluid inflow in the treatment well as the fluids from the surface may likely be cooler than formation temperatures. In one or more embodiments, temperature measurements in observation wells can be used to determine fluid communication between the treatment well and observation well, or to determine formation fluid movement.

In certain embodiments, DAS data may be used to determine fluid allocation in real-time as acoustic noise is generated when fluid flows through the casing and through perforations into the formation. Phase and intensity based interferometric sensing systems may be sensitive to temperature and vibrations, both mechanical as well as acoustically induced. In one or more embodiments, DAS data may be converted from time series data to frequency domain data using Fast Fourier Transforms (FFT). In some embodiments, other transforms, such as, for example wavelet transforms, may also be used to generate different representations of the data. Various frequency ranges can be used for different purposes and where e.g. low frequency signal changes may be attributed to formation strain changes or fluid movement and other frequency ranges may be indicative if fluid or gas movement. In certain embodiments, various filtering techniques may be applied to generate indicators of events that may be of interest. In one or more embodiments, the indicators may include formation movement due to growing natural fractures, formation stress changes during the fracturing operations and this effect may also be called stress shadowing, fluid seepage during the fracturing operation as formation movement may force fluid into an observation well, fluid flow from fractures, and fluid and proppant flow from frac hits. In some embodiments, each indicator may have a characteristic signature in terms of frequency content and/or amplitude. In other embodiments, each indicator may have or exhibit a unique time dependent behavior. These indicators may also be present at other data types and not limited to DAS data.

In certain embodiments, DAS systems may also be used to detect various seismic events where stress fields and/or growing fracture networks generate microseismic events. In some embodiments, DAS systems may also be used where perforation charge events are used to determine travel time between horizontal wells. In one or more embodiments, the seismic information may be used from stage to stage to determine changes in travel time as the formation is fractured and filled with fluid and proppant. In one or more embodiments, the DAS systems may also be used with surface seismic sources to generate vertical seismic profiles before, during, and/or after a fracturing job to determine the effectiveness of the fracturing job and production effectiveness.

In certain embodiments, DSS data may be generated using various approaches. For example, in one or more embodiments, static strain data may be used to determine absolute strain changes over time. In some embodiments, static strain data may be measured using Brillouin based systems or quasi-distributed strain data from FBG based system. In other embodiments, static strain may be used to determine propped fracture volume by looking at deviations in strain data from a measured strain baseline before fracturing a stage. In some embodiments, it may also be possible to determine formation properties like permeability, poroelastic responses, and/or leak off rates based on the change of strain over time and the rate at which the strain changes over time. In one or more embodiments, dynamic strain data may be used in real-time to detect fracture growth through an appropriate inversion model, and appropriate actions like dynamic changes to fluid flow rates in the treatment well, addition of diverters or chemicals into the fracturing fluid, and/or changes to proppant concentrations or types. In some embodiments, dynamic strain data may then be used to mitigate detrimental effects.

In certain embodiments, FBGs based systems may also be used to obtain a number of different measurements. In some embodiments, FBGs may be partial reflectors that can be used as temperature and strain sensors. In other embodiments, FBGs may be used to make various interferometric sensors with very high sensitivity. In some embodiments, FBGs may be used as point sensors or quasi-distributed sensors where these FBG based sensors can be used independently or with other types of fiber optic based sensors. In one or more embodiments, FBGs may be manufactured into an optical fiber at a specific wavelength, and other system like DAS, DS S or DTS systems may operate at different wavelengths in the same fiber and measure different parameters simultaneously as the FBG based systems using Wavelength Division Multiplexing (WDM).

In certain embodiments, the sensors may be placed in either the treatment well or one or more monitoring well(s) to measure well communication. In some embodiments, the treatment well pressure, rate, proppant concentration, diverters, fluids and chemicals may be altered to change the hydraulic fracturing treatment. These changes may impact the formation responses in several different ways such as, for example:

- stress fields may change, and this may generate microseismic effects that can be measured with DAS systems and/or single point seismic sensors like geophones;
- fracture growth rates may change which may generate changes in measured microseismic events and event distributions over time, or changes in measured strain using the low frequency portion or the DAS signal or Brillouin based sensing systems;
- pressure changes due to poroelastic effects may be measured in the monitoring well;
- pressure data may be measured in the treatment well and correlated to formation responses; and
- various changes in treatment rates and pressure may generate events that can be correlated to fracture growth rates.

In one or more embodiments, several measurements may be combined to determine adjacent well communication, and this information can be used to change the hydraulic fracturing treatment schedule to generate desired outcomes.

In certain embodiments, the methods and systems of the present disclosure may be used to optimize the treatment schedule in real-time to achieve the highest proppant placement efficiency. In one or more embodiments, the methods and systems of the present disclosure may be used to form a treatment plan based on a variety of proppant schedule options. For example, in certain embodiments, the proppant placement plan may include different Ramp slopes, maximum proppant concentrations, number of steps, and/or dimensions of the steps. Additionally, in some embodiments, each treatment stage may have different downhole conditions; therefore, a single proppant schedule may not serve best for all the stages of the well. Thus, in one or more embodiments, it may be necessary to recommend the optimal treatment plan in real-time based on the downhole response of the formation, which in turn can help to achieve higher proppant placement efficiency or minimize screen out risk. In some embodiments, the treatment plan may be based on one or more properties of the treatment or pad fluids and/or one or more properties of the downhole formation. For example, in some embodiments, the treatment plan may be based on one or more completion variables, treatment design variables, downhole response variables, proppant schedule variables, and/or subterranean formation properties. In one or more embodiments, the completion variables may be one or more of total perforations in a stage, total clusters in a stage, magnitude of tapering of the number of holes per cluster, inter and intra cluster spacing and stage length. In one or more embodiments, the treatment design variables may be one or more of total fluid volume, total proppant volume, average treatment rate, and friction reducer type and concentration. In one or more embodiments, the downhole response variables may be a measured surface or downhole pressure, microseismic event, fiber optics measurement and titlmeter. In one or more embodiments, the proppant schedule variables may be one or more of maximum desired proppant concentration, proppant mass, proppant type, mesh, and properties or desired proppant sequence. In one or more embodiments, the subterranean formation properties may be one or more of mechanical properties of the formation, pore pressure, mineralogy, natural fracture distribution, and tortuosity.

As described above, in certain embodiments the treatment plan can be selected in real-time. In other words, in one or more embodiments, the treatment plan is selected after measuring one or more properties during the pad fluid stage of a fracturing job. In other embodiments, it may be advantageous to alter the treatment plan during a particular fracturing job. For example, in certain embodiments, the proppant placement plan may originally be a Ramp proppant placement plan having a predetermined Ramp slope. However, in some embodiments, once the Ramp procedure begins, monitoring of the one or more properties may suggest that a different Ramp slope, or alternatively a Step proppant placement plan, may yield a higher cumulative uniformity index ("UI"). Thus, in some embodiments, the proppant placement plan may swap from a Ramp to a Step proppant placement plan during an ongoing fracturing job. Similarly, in other embodiments, the proppant placement plan may swap from a Step to a Ramp proppant placement plan during an ongoing fracturing job.

Another potential advantage of methods and systems of the present disclosure is the ability to provide a statistical or machine learning model. In certain embodiments, a machine-learning model may be using the input variables to predict the magnitude of downhole proppant placement through a "final misplaced proppant" metric. As used in the present disclosure, misplaced proppant may refer to the sum of the proppant mass below or above the mean proppant allocation per cluster. In some embodiments, the input variables may be one or more of the variables described above, including completion variables, treatment design variables, downhole response variables, proppant schedule variables, and/or subterranean formation properties. In some embodiments, the machine-learning model will become more capable of properly predicting the optimum treatment plan based on the one or more input variables provided to it. Thus, in certain embodiments, the machine-learning model may achieve better results the more times it is used. In one or more embodiments, the machine learning model may optimize the misplaced treatment fluid, slurry, or proppant. For example, in some embodiments, the machine learning model may minimize or reduce the misplaced treatment fluid, slurry, or proppant.

In one or more embodiments, the methods and systems of the present disclosure may include a machine learning model. In some embodiments, the machine learning model may be or include a hardware or software module that adjusts one or more variables within the control system to increase the efficiency of future treatment plans. In some embodiments, the machine learning model may adjust one or more variables within the control system to increase the efficiency of the current treatment plan. In other embodiments, the machine learning module may adjust one or more variables within the control system to increase the efficiency of a future treatment plan for a treatment operation within the same well or subterranean formation. In still other embodiments, the machine learning model may adjust one or more variables within the control system to increase the efficiency of a future treatment plan for a treatment operation within a different well or subterranean formation.

In certain embodiments, machine learning models can be developed using statistical or machine learning techniques, such as deep learning, machine learning, Bayesian modeling, geospatial modeling, and other techniques. In some embodiments, deep learning models can further utilize neural networks, such as convolutional neural networks, recurrent neural networks, other neural networks, or a combination of neural networks. In other embodiments, the machine learning models can include random forest, gradient boost, decision trees, and other algorithm techniques. In one or more embodiments, machine learning models can involve hierarchical and non-hierarchical techniques. In certain embodiments, multivariate time-series forecasting models or machine learning or deep learning algorithms (such as recurrent neural network, long-short term memory (LSTM), and other models) can be used to build the models. In some embodiments, during the optimization of the machine learning model, an optimization algorithm, such as a genetic algorithm, pattern search, differential evolution, and other types, can be applied to the collection of selected variables within the provided constraints of the model.

In one or more embodiments, the treatment plan may be based, at least in part, on one or more characteristics of the formation entry points. In some embodiments, a single formation entry point may be the number of perforation holes shot over a finite interval in a fracturing layer, separated from another cluster or other clusters within the same or different pay zone spaced away from that cluster by another finite interval. In certain embodiments, a formation entry point may be characterized by its length, the total number of holes, the size of the holes and the phasing of the holes. The number and nature of formation entry points may vary significantly for different formations and different pay zones within a given formation. In one or more embodiments, the treatment plan may be based, at least in part, on one or more of the number of formation entry points per given pay zone, the formation entry point length, the formation entry point separation, or the shot density within a formation entry point. In some embodiments, the number of formation entry points per given pay zone may be between 1 and 300. In other embodiments, the number of formation entry points per given pay zone may be between 1 and 100. In some embodiments, formation entry point length may be within a range of from about 0.15 m to about 3.0 m. In other embodiments, formation entry point length may be within a range of from about 0.5 m to about 2.0 m. In some embodiments, formation entry point separation may be in the range of from about 0.30 m to about 90 m. In other embodiments, formation entry point separation may be in a range of from about 0.5 m to about 30 m. In some embodiments, shot density within a cluster may be within a range of from about 1 to 30 shots per 0.3 m.

In certain embodiments, the methods and systems of the present disclosure may use one or more treatment fluids. In some embodiments, the treatment fluids may be fracturing fluids. The treatment fluids used in the methods and systems of the present disclosure may include any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the fracturing fluids may include a mixture of one or more fluids and/or gases, including but not limited to emulsions, foams, and the like.

The treatment fluids used in the systems and methods of the present disclosure also include proppants. The proppants used in the methods and systems of the present disclosure may include any suitable particulate material known in the art that is capable of being deposited in one or more of the fractures in the formation (whether created, enhanced, and/or pre-existing). Examples of proppants may include: bubbles or microspheres, such as made from glass, ceramic, polymer, sand, and/or another material. Other examples of proppants may include particles of any one or more of: calcium carbonate ($CaCO_3$); barium sulfate ($BaSO_4$); organic polymers; cement; boric oxide; slag; sand; bauxite; ceramic materials; glass materials; polymer materials; polytetrafluoroethylene materials; nut shell pieces; cured resinous particulates including nut shell pieces; seed shell pieces; cured resinous particulates including seed shell pieces; fruit pit pieces; cured resinous particulates including fruit pit pieces; wood; composite particulates; and combinations thereof. Suitable composite particulates may include a binder and a filler material wherein suitable filler materials may include any one or more of: silica; alumina; fumed carbon; carbon black; graphite; mica; titanium dioxide; meta-silicate; calcium silicate; kaolin; talc; zirconia; boron; fly ash; hollow glass microspheres; solid glass; and combinations thereof.

In certain embodiments, the treatment fluids used in the methods and systems of the present disclosure optionally may include any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after a viscosifying agent has been at least partially hydrated in the fluid. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the proppants and/or other components of the treatment fluid may be metered directly into a base treatment fluid to form a treatment fluid. In certain embodiments, the base fluid may be mixed with the proppants and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

Certain embodiments of the methods and systems disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and systems may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, pump and blender system 50, an additive source 70, and a control unit 80, and resides at the surface at a well site where a well 60 is located. The pump and blender system 50 may further comprise a pump 55 and one or more sensors 65. In certain embodiments, one or more sensors 65 may be placed downhole well 60. In certain embodiments, one or more sensors 65 may be coupled to any one or more of the fracturing fluid producing apparatus 20, fluid source 30, proppant source 40, and control unit 80, for example, sensor 65 coupled to control unit 80 as shown in FIG. 1. In certain instances, the fracturing fluid producing apparatus 20 combines a self-degradable particulate material with fluid (e.g., liquid or substantially liquid) from fluid source 30, to produce a fracturing fluid that may be used to fracture the formation. The fracturing fluid can be a fluid ready for use in a fracture stimulation treatment of the well 60 or a concentrate to which additional fluid is added prior to use in a fracture stimulation of the well 60. In some embodiments, the fracturing fluid producing apparatus 20 can be omitted and the fracturing fluid sourced directly from the fluid source 30. In certain embodiments, the fracturing fluid may include water, a hydrocarbon fluid, a polymer gel, foam, air, wet gases and/or other fluids.

The proppant source 40 can include a proppant for combination with the fracturing fluid. In certain embodiments, one or more treatment particulates of the present disclosure may be provided in the proppant source 40 and thereby combined with the fracturing fluid with the proppant. The system may also include additive source 70 that provides one or more additives (e.g., gelling agents, surfactants, weighting agents, and/or other additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, self-degradable particulate material, proppants, and/or other compositions to the pumping and blender system 50. Such metering devices may permit the pumping and blender system 50 to source from one, some or all of the different sources at a given time and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
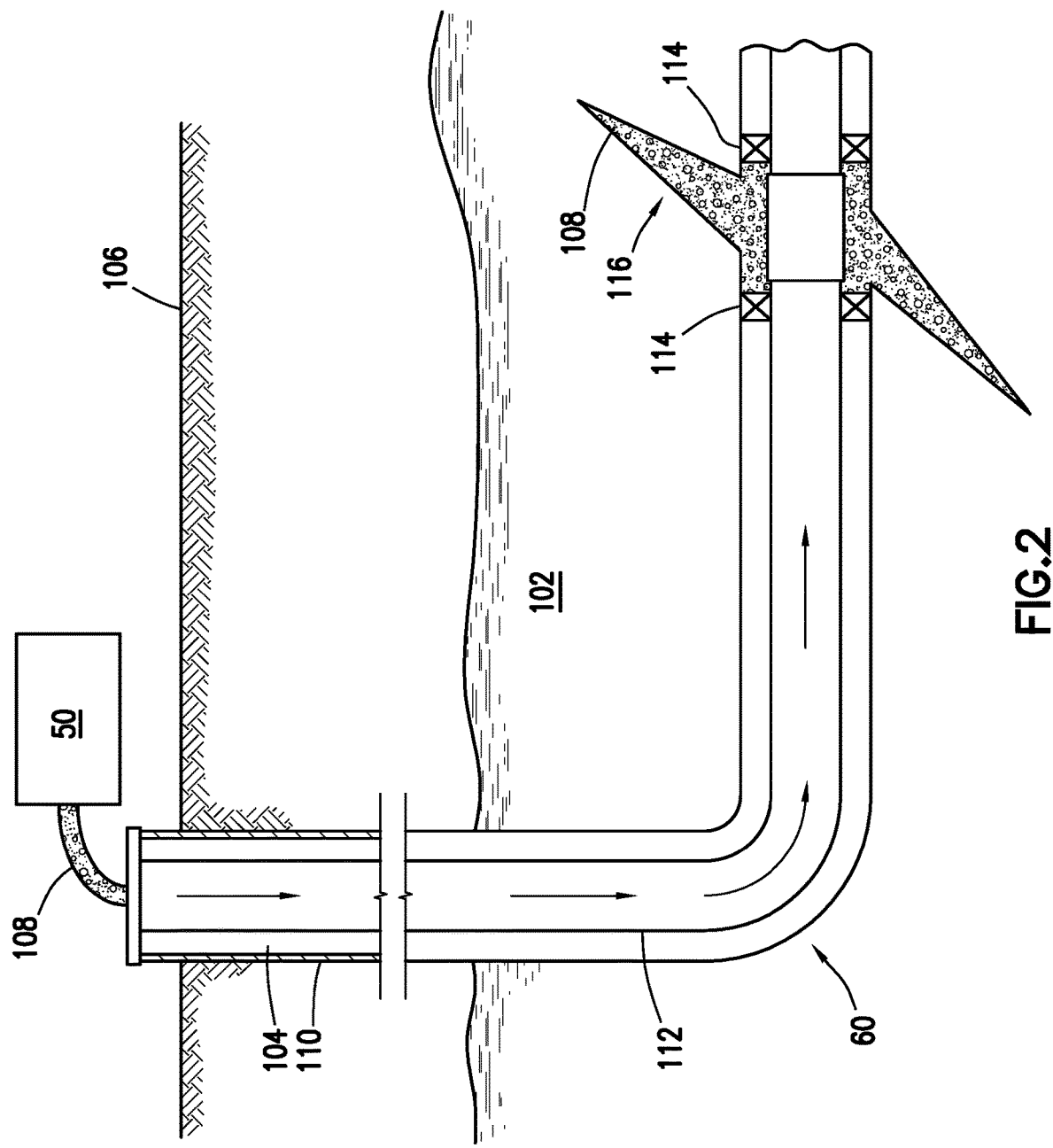
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a wellbore 104. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the wellbore 104. The pump and blender system 50 is coupled to a work string 112 to pump the fracturing fluid 108 into the wellbore 104. The working string 112 may include coiled tubing, jointed pipe, and/or other structures that allow fluid to flow into the wellbore 104. The working string 112 can include flow control devices, bypass valves, ports, and or other tools or well devices that control a flow of fluid from the interior of the working string 112 into the subterranean zone 102. For example, the working string 112 may include ports adjacent the wellbore wall to communicate the fracturing fluid 108 directly into the subterranean formation 102, and/or the working string 112 may include ports that are spaced apart from the wellbore wall to communicate the fracturing fluid 108 into an annulus in the wellbore between the working string 112 and the wellbore wall.

The working string 112 and/or the wellbore 104 may include one or more sets of packers 114 that seal the annulus between the working string 112 and wellbore 104 to define an interval of the wellbore 104 into which the fracturing fluid 108 will be pumped. FIG. 2 shows two packers 114, one defining an uphole boundary of the interval and one defining the downhole end of the interval. When the fracturing fluid 108 is introduced into wellbore 104 (e.g., in FIG. 2, the area of the wellbore 104 between packers 114) at a sufficient hydraulic pressure, one or more fractures 116 may be created in the subterranean zone 102. The proppants (and/or treatment particulates of the present disclosure) in the fracturing fluid 108 may enter the fractures 116 where they may remain after the fracturing fluid flows out of the wellbore. These proppants may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Figure 3:
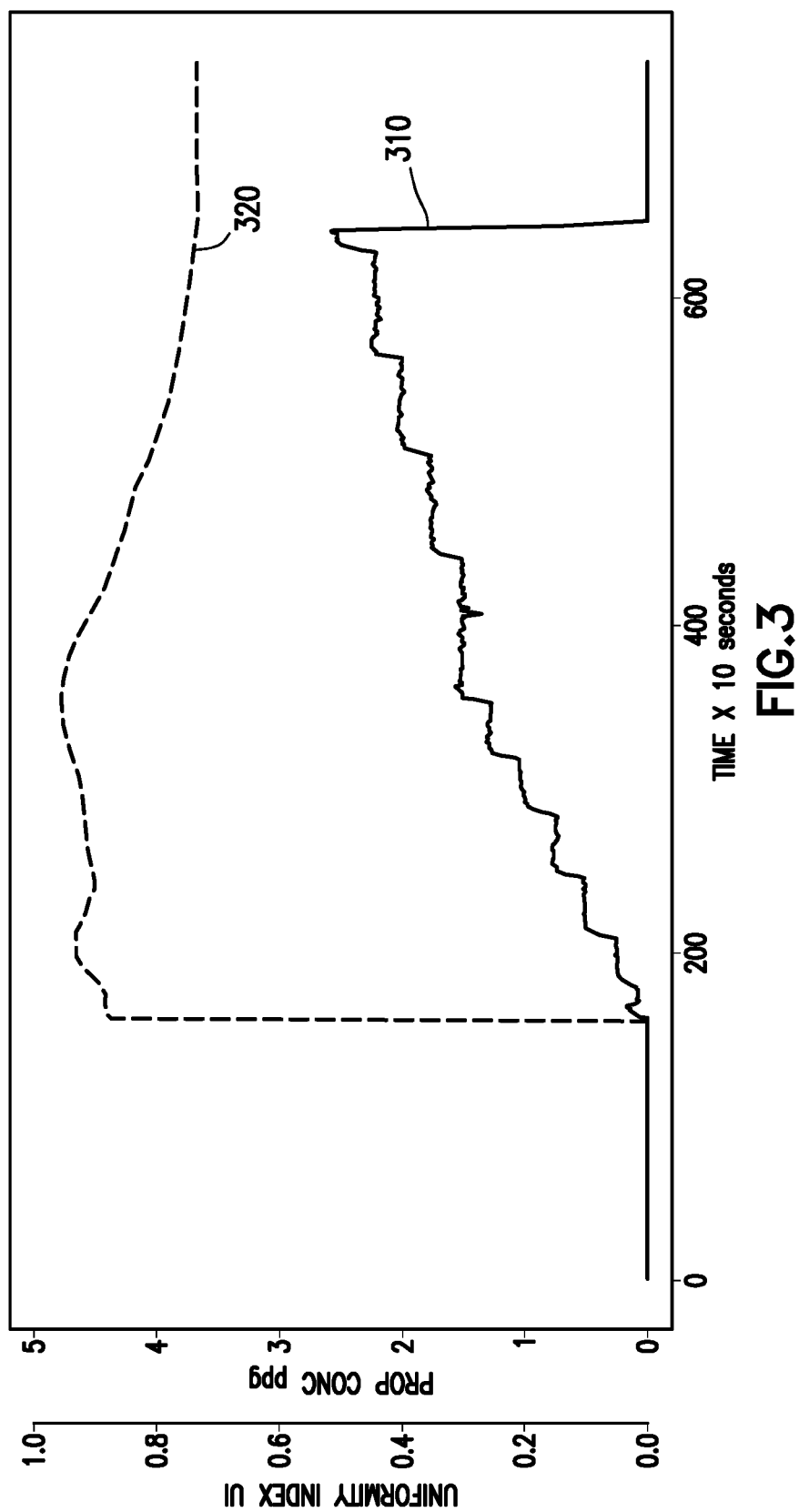
FIG. 3 is a graph illustrating data relating to a Step proppant placement plan in certain embodiments of the present disclosure.

FIG. 3 depicts certain observed phenomena of a fracturing job performed using a Step proppant placement plan. Proppant concentration line 310 shows the concentration of proppant as a function of time. The Step proppant placement plan was designed and executed with maximum concentration of about 2.25 ppg. A DAS was used during the job to measure and record the flow of fracturing fluid into each of the clusters. The cumulative UI line 320 shows the UI of the job as a function of time. The cumulative UI line 320 shows that the initial UI of the job was about 0.9, whereas the final cumulative UI was about 0.73 for the Step proppant placement plan.

Figure 4:
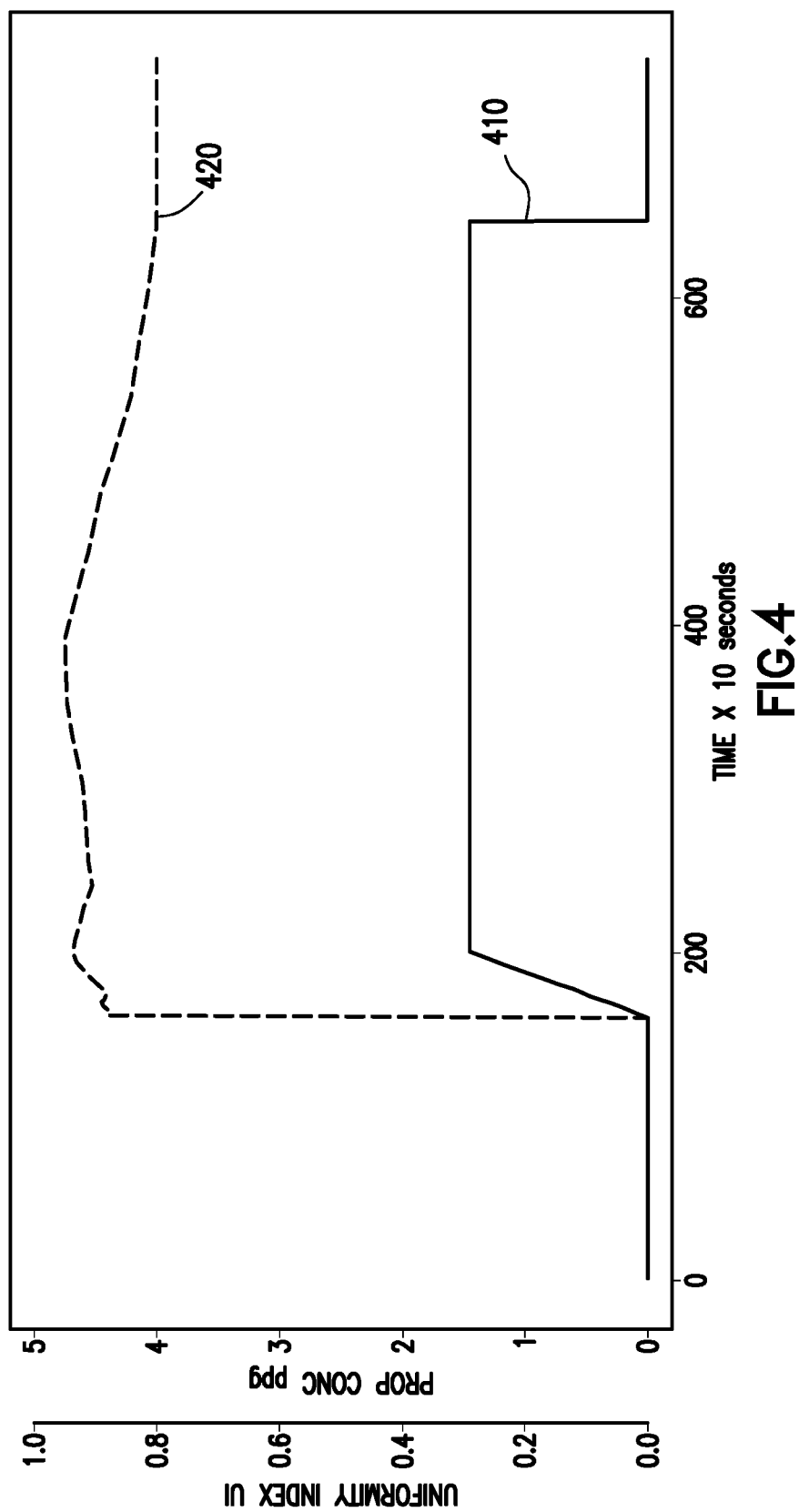
FIG. 4 is a graph illustrating data relating to a Ramp proppant placement plan in certain embodiments of the present disclosure.

In contrast, FIG. 4 depicts a simulated fracturing job performed on the same formation using a Ramp proppant placement plan. Proppant concentration line 410 shows the concentration of proppant as a function of time. The Ramp proppant placement plan was designed and simulated with a maximum concentration of about 1.5 ppg and a Ramp time of about 7 minutes. The cumulative UI line 420 shows the UI of the job as a function of time. The cumulative UI line 420 shows that the initial UI of the job was about 0.9, whereas the final cumulative UI would have been about 0.80 for the Ramp proppant placement plan.

Figure 5:
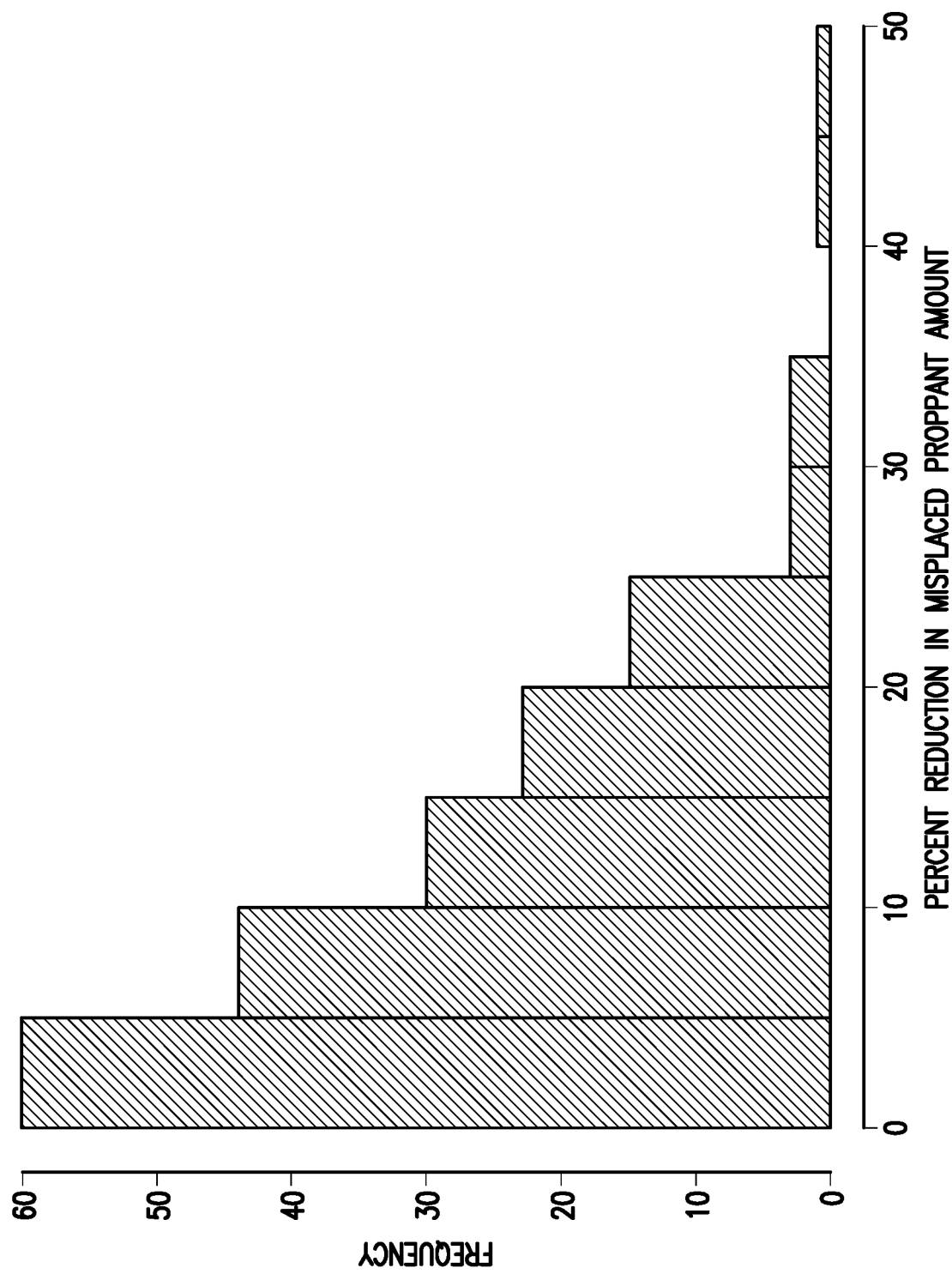
FIG. 5 is a graph illustrating data relating to reduction in misplaced proppant in accordance with certain embodiments of the present disclosure.

FIG. 5 depicts a histogram of percentage reduction in misplaced proppant based on model recommendations compared to original design. The results depicted in FIG. 5 were generated using historical data from a number of prior fracturing operations. Data from a variety of previously completed fracturing operations was collected and loaded into a computer simulation designed to create treatment plans in accordance with certain embodiments of the present disclosure. Using the data from the previous fracturing operations, the computer simulation designed a treatment plan to maximize proppant placement in accordance with the methods and systems of the present disclosure. The model compared the actual proppant placement characteristics from these prior fracturing operations with the proppant placement characteristics obtained using the treatment plans received from the computer simulations. FIG. 5 shows that a substantial number of the operations would have had reduced misplaced proppant amounts following the methods and systems of the present disclosure.

An embodiment of the present disclosure is a method that includes providing a treatment fluid; introducing the treatment fluid into a wellbore penetrating at least a first portion of a subterranean formation at or above a pressure sufficient to create or enhance one or more formation entry points in the subterranean formation; measuring one or more properties of the treatment fluid or downhole conditions within the subterranean formation; creating a treatment plan substantially in real-time including one or more plans selected from the group consisting of: a proppant placement plan, a fluid placement plan, a completion plan, and any combination thereof, wherein the treatment plan is based at least partially on the one or more properties of the treatment fluid or downhole conditions; and treating at least the first portion of the subterranean formation in accordance with the treatment plan.

In one or more embodiments described in the preceding paragraph, the one or more properties of the treatment fluid or downhole conditions are selected from the group consisting of: a completion variable, a treatment design variable, a downhole response variable, a proppant schedule variable, a treatment fluid characteristic, or a subterranean formation property. In one or more embodiments described above, the step of creating the treatment plan further includes calculating a flow distribution or resistance profile of the formation entry points. In one or more embodiments described above, the flow distribution profile is calculated using one or more indicators selected from the group consisting of: a uniformity index, a calibrated fracture model, an amount of misplaced fluid or slurry at the formation entry points, and any combination thereof. In one or more embodiments described above, the proppant placement plan is selected from the group consisting of: a Ramp proppant procedure, a Step proppant procedure, and any combination thereof. In one or more embodiments described above, the step of creating the treatment plan further includes using a computer to create the treatment plan. In one or more embodiments described above, the method further includes adjusting one or more variables within the computer to increase the efficiency of creating at least one future treatment plan. In one or more embodiments described above, the step of creating the treatment plan further includes selecting a Ramp proppant procedure if the uniformity index is greater than a predetermined setpoint value. In one or more embodiments described above, the step of creating the treatment plan further includes selecting a Step proppant procedure if the uniformity index is less than a predetermined setpoint value. In one or more embodiments described above, the method further includes introducing a proppant slurry into the treatment subterranean formation in accordance with the treatment plan. In one or more embodiments described above, the treatment plan includes a proppant placement plan that is designed to reduce an amount of misplaced treatment proppant in the subterranean formation. In one or more embodiments described above, the method further includes detecting a change in the one or more properties of the treatment fluid; and altering the treatment plan in response to the change in the one or more properties of the treatment fluid.

Another embodiment of the present disclosure is a system that includes a pump for delivering a treatment fluid into a subterranean formation; one or more sensors for measuring one or more properties of the treatment fluid; a control system for creating a treatment plan in substantially real-time including one or more plans selected from the group consisting of: a proppant placement plan, a fluid placement plan, a completion plan, and any combination thereof, wherein the treatment plan is based at least in part on the one or more properties of the treatment fluid or downhole conditions; and a proppant delivery system for introducing proppant into the subterranean formation in accordance with the treatment plan.

In one or more embodiments described in the preceding paragraph, the system further includes one or more formation entry points penetrating at least a portion of the subterranean formation. In one or more embodiments described above, the one or more sensors are configured to measure one or more characteristics of the formation entry points. In one or more embodiments described above, the one or more sensors are selected from the group consisting of a distributed acoustic sensing (DAS) sensor, a distributed temperature sensing (DTS) sensor, a pressure gauge, a microseismic sensor, and any combination thereof. In one or more embodiments described above, the control system further includes a machine-learning module that adjusts one or more variables within the control system to increase the efficiency of at least one future treatment plans.

Another embodiment of the present disclosure is a method that includes providing a treatment fluid; introducing the treatment fluid into a wellbore penetrating at least a first portion of a subterranean formation at or above a pressure sufficient to create or enhance one or more formation entry points in the subterranean formation; measuring one or more properties of the treatment fluid or downhole conditions within the subterranean formation; calculating a uniformity index based at least in part on the one or more properties of the treatment fluid or downhole conditions; and creating a treatment plan substantially in real-time including one or more plans selected from the group consisting of: a proppant placement plan, a fluid placement plan, a completion plan, and any combination thereof, wherein the treatment plan is based at least partially on the one or more properties of the treatment fluid or downhole conditions; and treating at least the first portion of the subterranean formation in accordance with the treatment plan.

In one or more embodiments described in the preceding paragraph, the step of creating the treatment plan further includes comparing the uniformity index of the formation entry points to a predetermined setpoint value. In one or more embodiments described above, the method further includes detecting a change in the one or more properties of the treatment fluid or downhole conditions; and altering the treatment plan in response to the change in the one or more properties of the treatment fluid or downhole conditions.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid;
introducing the treatment fluid into a wellbore penetrating at least a first portion of a subterranean formation at or above a pressure sufficient to create or enhance one or more formation entry points in the subterranean formation;
measuring one or more properties of the treatment fluid or downhole conditions within the subterranean formation;
creating a treatment plan substantially in real-time comprising one or more plans selected from the group consisting of: a proppant placement plan, a fluid placement plan, a completion plan, and any combination thereof, wherein the treatment plan is based at least partially on the one or more properties of the treatment fluid or downhole conditions, wherein the proppant placement plan comprises determining a slope of a proppant placement schedule;
selecting a Ramp proppant procedure if a uniformity index is greater than a predetermined setpoint value or a Step proppant procedure if the uniformity index is less than the predetermined setpoint value; and
treating at least the first portion of the subterranean formation in accordance with the treatment plan.

2. The method of claim 1, wherein the one or more properties of the treatment fluid or downhole conditions are selected from the group consisting of: a completion variable, a treatment design variable, a downhole response variable, a proppant schedule variable, a treatment fluid characteristic, or a subterranean formation property.

3. The method of claim 1, wherein the step of creating the treatment plan further comprises calculating a flow distribution or resistance profile of the formation entry points.

4. The method of claim 3, wherein the flow distribution profile is calculated using one or more indicators selected from the group consisting of: a uniformity index, a calibrated fracture model, an amount of misplaced fluid or slurry at the formation entry points, and any combination thereof.

5. The method of claim 1, wherein the proppant placement plan is selected from the group consisting of: a Ramp proppant procedure, a Step proppant procedure, and any combination thereof.

6. The method of claim 1, wherein the step of creating the treatment plan further comprises using a computer to create the treatment plan.

7. The method of claim 6, further comprising adjusting one or more variables within the computer to increase an efficiency of creating at least one future treatment plan.

8. The method of claim 1 further comprising introducing a proppant slurry into the subterranean formation in accordance with the treatment plan.

9. The method of claim 1, wherein the treatment plan comprises a proppant placement plan that is designed to reduce an amount of misplaced treatment proppant in the subterranean formation.

10. The method of claim 1 further comprising:
detecting a change in the one or more properties of the treatment fluid; and
altering the treatment plan in response to the change in the one or more properties of the treatment fluid.

11. A system comprising:
a pump for delivering a treatment fluid into a subterranean formation;
one or more sensors for measuring one or more properties of the treatment fluid or downhole conditions;
a control system for creating a treatment plan in substantially real-time comprising one or more plans selected from the group consisting of: a proppant placement plan, a fluid placement plan, a completion plan, and any combination thereof, wherein the treatment plan is based at least in part on the one or more properties of the treatment fluid or downhole conditions, wherein the proppant placement plan comprises determining a slope of a proppant placement schedule, and wherein the proppant placement plan comprises a Ramp proppant procedure if a uniformity index is greater than a predetermined setpoint value or a Step proppant procedure if the uniformity index is less than the predetermined setpoint value; and
a proppant delivery system for introducing proppant into the subterranean formation in accordance with the treatment plan.

12. The system of claim 11 further comprising one or more formation entry points penetrating at least a portion of the subterranean formation.

13. The system of claim 11, wherein the one or more sensors are configured to measure one or more characteristics of the formation entry points.

14. The system of claim 11, wherein the one or more sensors are selected from the group consisting of a distributed acoustic sensing (DAS) sensor, a distributed temperature sensing (DTS) sensor, a pressure gauge, a microseismic sensor, and any combination thereof.

15. The system of claim 11, wherein the control system further comprises a machine-learning module that adjusts one or more variables within the control system to increase an efficiency of at least one future treatment plan.

16. A method comprising:
providing a treatment fluid;
introducing the treatment fluid into a wellbore penetrating at least a first portion of a subterranean formation at or above a pressure sufficient to create or enhance one or more formation entry points in the subterranean formation;
measuring one or more properties of the treatment fluid or downhole conditions within the subterranean formation;
calculating a uniformity index based at least in part on the one or more properties of the treatment fluid or downhole conditions; creating a treatment plan substantially in real-time comprising one or more plans selected from the group consisting of: a proppant placement plan, a fluid placement plan, a completion plan, and any combination thereof, wherein the treatment plan is based at least partially on the one or more properties of the treatment fluid or downhole conditions, and wherein the proppant placement plan comprises determining a slope of a proppant placement schedule;
selecting a Ramp proppant procedure if the uniformity index is greater than a predetermined setpoint value or a Step proppant procedure if the uniformity index is less than the predetermined setpoint value; and
treating at least the first portion of the subterranean formation in accordance with the treatment plan.

17. The method of claim 16, wherein the step of creating the treatment plan further comprises comparing the uniformity index of the formation entry points to a predetermined setpoint value.

18. The method of claim 16 further comprising:
detecting a change in the one or more properties of the treatment fluid or downhole conditions; and altering the treatment plan in response to the change in the one or more properties of the treatment fluid or downhole conditions.

\* \* \* \* \*